(12) United States Patent
Williams

(10) Patent No.: US 9,348,384 B2
(45) Date of Patent: May 24, 2016

(54) DISTRIBUTED ENERGY SOURCE SYSTEM

(71) Applicant: Kevin J. Williams, Kansas City, MO (US)

(72) Inventor: Kevin J. Williams, Kansas City, MO (US)

(*) Notice: Subject to any disclaimer, the term of this patent is extended or adjusted under 35 U.S.C. 154(b) by 528 days.

(21) Appl. No.: 13/836,971

(22) Filed: Mar. 15, 2013

(65) Prior Publication Data

US 2014/0136008 A1      May 15, 2014

Related U.S. Application Data

(63) Continuation-in-part of application No. 13/674,735, filed on Nov. 12, 2012.

(51) Int. Cl.
*G06F 1/26* (2006.01)
*H02J 3/32* (2006.01)
*H02J 13/00* (2006.01)
*H02J 3/14* (2006.01)

(52) U.S. Cl.
CPC ... *G06F 1/26* (2013.01); *H02J 3/32* (2013.01); *H02J 13/00* (2013.01); *H02J 2003/143* (2013.01); *Y02B 70/3266* (2013.01); *Y02B 90/222* (2013.01); *Y04S 20/12* (2013.01); *Y04S 20/242* (2013.01)

(58) Field of Classification Search
CPC .............................. G01N 25/20; G01D 4/002
USPC ......................................................... 700/295
See application file for complete search history.

(56) References Cited

U.S. PATENT DOCUMENTS

| 2007/0271006 | A1 | 11/2007 | Golden et al. |
| 2007/0276547 | A1 | 11/2007 | Miller |
| 2008/0047271 | A1 | 2/2008 | Ingersoll |
| 2008/0172279 | A1 | 7/2008 | Enis et al. |
| 2009/0195349 | A1* | 8/2009 | Frader-Thompson . G01D 4/002 340/3.1 |
| 2009/0240380 | A1 | 9/2009 | Shah et al. |
| 2009/0302996 | A1 | 12/2009 | Rhee et al. |
| 2009/0326729 | A1 | 12/2009 | Hakim et al. |
| 2010/0010923 | A1 | 1/2010 | Shore et al. |

(Continued)

FOREIGN PATENT DOCUMENTS

WO      WO 2011089854      7/2011

OTHER PUBLICATIONS

First Action Interview Pre-Interview Communication dated Feb. 20, 2015 in U.S. Appl. No. 13/674,735, 5 pages.

(Continued)

*Primary Examiner* — Michael D Masinick
(74) *Attorney, Agent, or Firm* — Spencer Fane LLP

(57) ABSTRACT

Systems and methods for managing energy within an inhabitable environment are provided. An energy storage system includes storing and managing energy. The storage of energy may be based on user preferences. The management of energy includes directing energy within the inhabitable environment according to user preferences and mapping data. Mapping data includes matching an electrical outlet to a location and/or device within the inhabitable environment. Instructions are provided by the computing device to the electrical components based on the mapping to control the electrical components and electrical devices.

23 Claims, 8 Drawing Sheets

(56) References Cited

U.S. PATENT DOCUMENTS

| | | | |
|---|---|---|---|
| 2010/0100253 A1 | 4/2010 | Fausak et al. | |
| 2010/0211233 A1 | 8/2010 | Roscoe et al. | |
| 2010/0264739 A1 | 10/2010 | Errington | |
| 2011/0001356 A1 | 1/2011 | Pollack | |
| 2011/0010018 A1 | 1/2011 | Haugh | |
| 2011/0196547 A1 | 8/2011 | Park et al. | |
| 2011/0231028 A1 | 9/2011 | Ozog | |
| 2012/0053740 A1 | 3/2012 | Venkatakrishnan et al. | |
| 2012/0059527 A1 | 3/2012 | Beaston et al. | |
| 2012/0065796 A1 | 3/2012 | Brian et al. | |
| 2012/0065797 A1 | 3/2012 | Brian et al. | |
| 2012/0136499 A1 | 5/2012 | Jang | |
| 2012/0249048 A1 | 10/2012 | Nishibayashi | |
| 2013/0314094 A1* | 11/2013 | Farmer | G01N 25/20 324/430 |
| 2014/0136007 A1* | 5/2014 | Williams | G01D 4/002 700/295 |

OTHER PUBLICATIONS

Final Office Action dated Feb. 26, 2015 in U.S. Appl. No. 12/976,964, 9 pages.
First Action Interview Office Action dated Apr. 29, 2015 in U.S. Appl. No. 13/674,735, 9 pages.
Non-Final Office Action dated Jul. 17, 2014 in U.S. Appl. No. 12/976,964, 8 pages.
Non-Final Office Action mailed May 8, 2013 in U.S. Appl. No. 12/976,964; 21 pages.
International Search Report and Written Opinion for PCT/US13/69473, mailed May 20, 2014, 19 pages.
International Search Report and Written Opinion for PCT/US2013/069475, mailed May 2, 2014, 11 pages.
Final Office Action in U.S. Appl. No. 12/976,964, mailed Oct. 9, 2013, 15 pages.
Emerson "Capacitors Age and Capacitors Have an End of Life"; Emerson Network Power, Columbus, Ohio, 2008.

* cited by examiner

| SOURCE LOCATION | CIRCUIT BREAKER | CONNECTED DEVICE | CONNECTION VIA WALL OUTLET | CONNECTION VIA SWITCH | CONNECTED WATTS | EST PEAK HOURS USED | EST AMPHRS |
|---|---|---|---|---|---|---|---|
| DINING ROOM | 1 | CEILING FIXTURE<br>WALL SCONCE<br>GFI OUTLET |  1 | 1<br>1<br>  |  |  |  |
| FORMAL LIVING ROOM | 2 | CEILING FIXTURE<br>TABLE LAMP<br>TABLE LAMP | 1<br>1 | 1 |  |  |  |
| HEARTH ROOM | 3 | CEILING FIXTURE<br>GALLERY LIGHT | 1<br>1 |  |  |  |  |
|  | 4 | TV<br>CABLE BOX<br>MODEM | 1<br>1 | 1 |  |  |  |

FIG. 5

DISTRIBUTED ENERGY SOURCE SYSTEM

CROSS-REFERENCE TO RELATED APPLICATIONS

This application is a continuation-in-part of U.S. patent application Ser. No. 13/674,735, filed Nov. 12, 2012, entitled "Personal Energy System," herein incorporated by reference.

INCORPORATED BY REFERENCE

The National Institute of Science & Technology (NIST) Framework and Roadmap for Smart Grid Interoperability Standards Release (Draft) 1.0, September 2009, is incorporated by reference herein.

BACKGROUND

The North American power grid was once called the 'supreme engineering achievement of the $20^{th}$ century.' Unfortunately, the power grid is quickly aging such that outages and inefficiencies result in great costs to end users. In addition, terror activities and malicious computer code threaten denial of service to the nation's critical infrastructure.

A growing movement to provide clean energy, utilizing such sources as wind, currently suffers from significant inefficiencies due to limitation within the power grid. Commercial wind farms often produce much greater energy than is realized because the transmissions lines cannot accommodate the amount of energy produced, thereby resulting in large amounts of wasted effort.

Residential applications are often seen as impractical due to costs, lack of providing enough energy during peak demand, and wasted energy during off-peak times. In addition, there is no application that provides two-way communication between consumers and the distribution source.

Current efforts to develop a smart grid are ongoing. A smart grid may be an electrical grid that uses information and communications technology to gather and act on information, such as information about the behaviors of suppliers and consumers, in an automated fashion to improve the efficiency, reliability, economics, and sustainability of the production and distribution of electricity.

The developments in the smart grid do not include providing the end user the ability to utilize and manage distributed energy sources. Further, there is no system that currently provides the capability of the distributed energy sources, such as in residential application, to return unused energy to the power grid, or store excess energy for later use by the consumer. Although smart meters allow electric utility companies to collect data at the consumer site, there is not a system that provides the consumer, or other interested stakeholders, the ability to collect usage and generation data, to deliver electricity more efficiently and detect problems within the system, and provide information that allows for strategic placement of distributed generation sources for overall performance improvement.

There exists a need to integrate electric power generation and electric storage techniques into a single delivery system. There also exists a need to connect with a meter to create a home electric power source with an ability to provide a two-way communication between consumers and the distribution source.

SUMMARY

Embodiments of the present invention relate to an energy storage system and an energy management system. The energy storage system allows for users to store, manage and provide energy to an inhabitable environment. The energy management system generates energy management data that informs a user about the historical trends of, predictions of and suggestions for energy usage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is illustrated by way of example and not limitation in the accompanying figures in which like references numerals indicate similar elements and in which:

FIG. 5 is a schematic diagram depicting an exemplary mapping information in which embodiments of the present invention may be employed;

DETAILED DESCRIPTION

Figure 1:
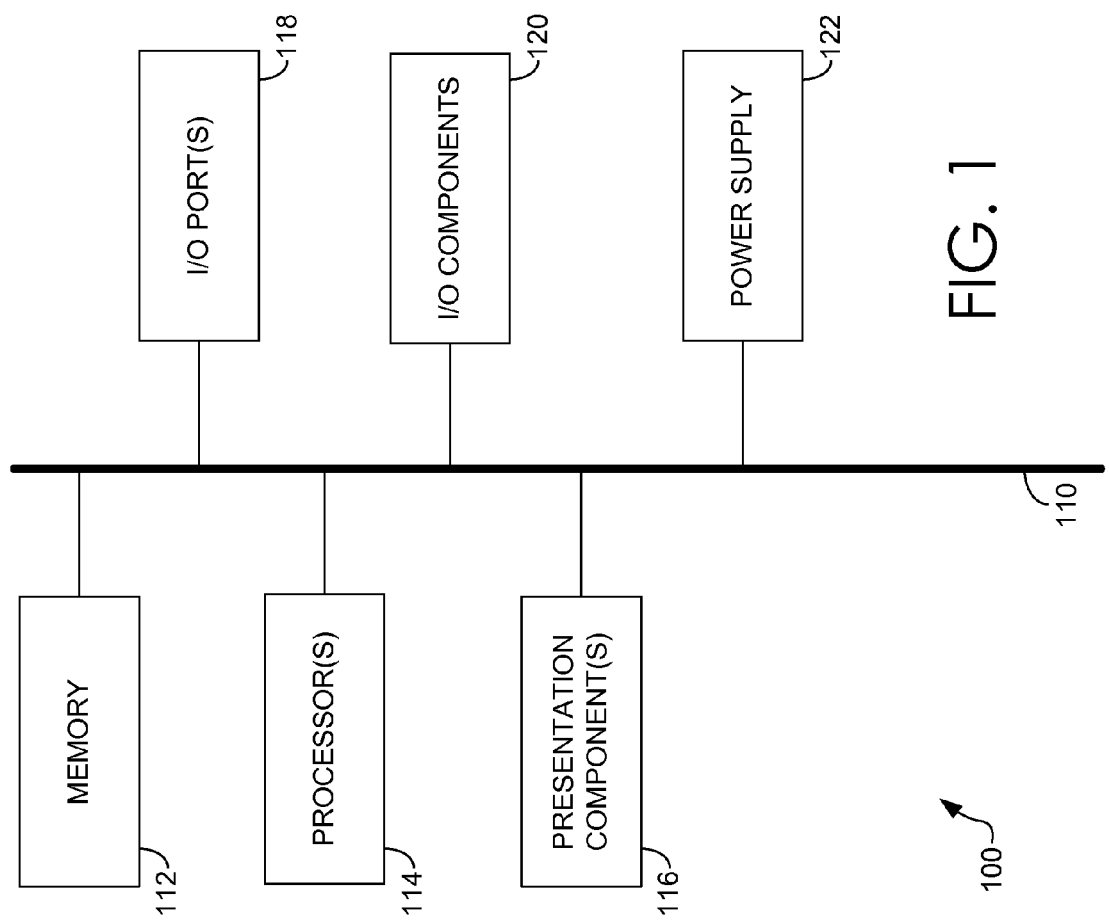
FIG. 1 is a block diagram of an exemplary computing system environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer-readable media for managing an energy flow of an environment through a user interface and alternative power source.

The present invention may utilize the properties of a smart grid system. For clarity and basic understanding, a brief description of a smart grid system is provided below. However, the present invention may stand separate and apart from such smart grid system. Further description of a smart grid network may be found in the National Institute of Science and Technology (NIST) Framework and Roadmap for Smart Grid Interoperability Standards Release (Draft) 1.0, September 2009, incorporated by reference herein.

The present invention allows for users to store, manage, and provide energy at an energy storage system. Further, the present invention allows for users to manage the flow of energy through the use of an energy management system.

Accordingly, one embodiment of the present invention is directed to computer-readable media for personal energy management. The method includes receiving mapping data, where the mapping data comprises a matching between at least one energy outlet and at least one device. The method further includes, receiving an energy management instruction. The method includes directing a flow of energy from an energy source to the at least one energy outlet, where the direction of the flow of energy is based on the mapping data and the energy management instruction.

In another embodiment, the present invention is directed to a system for personal energy management. The system includes a battery bank, a capacitor bank and a computing device. The computing device includes a processor coupled to a memory and is operable with a set of modules. The set of modules are configured to manage a flow of energy from the battery bank and the capacitor bank to a set of electrical components. The set of electrical components are located in an inhabitable environment, where the inhabitable environment includes at least one of: a heating system, a cooling system and an electrical outlet.

In yet another embodiment, the present invention is directed to method for directing a flow of energy. The method comprises receiving mapping data, where the mapping data comprising a matching between at least one energy outlet and at least one device. The method further includes, receiving an energy management instruction. The method includes directing a flow of energy from at least one of a battery bank and a capacitor bank to the at least one energy outlet, where the direction of the flow of energy is based on the mapping data and the energy management instruction.

Having briefly described an overview of embodiments of the present invention, an exemplary operating environment in which embodiments of the present invention may be implemented is described below in order to provide a general context for various aspects of the present invention.

Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network.

In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

With continued reference to FIG. 1, computing device 100 includes a bus 110 that directly or indirectly couples the following elements: memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer storage media in the form of volatile and/or nonvolatile memory. The memory may be removable, non-removable, or a combination thereof. Exemplary hardware devices include solid state memory, hard drives, optical disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, etc Smart Grid As described above, a smart grid may be an electrical grid that uses information and communications technology to gather and act on information, such as information about the behaviors of suppliers and consumers, in an automated fashion to improve the efficiency, reliability, economics, and sustainability of the production and distribution of electricity.

Figure 2:
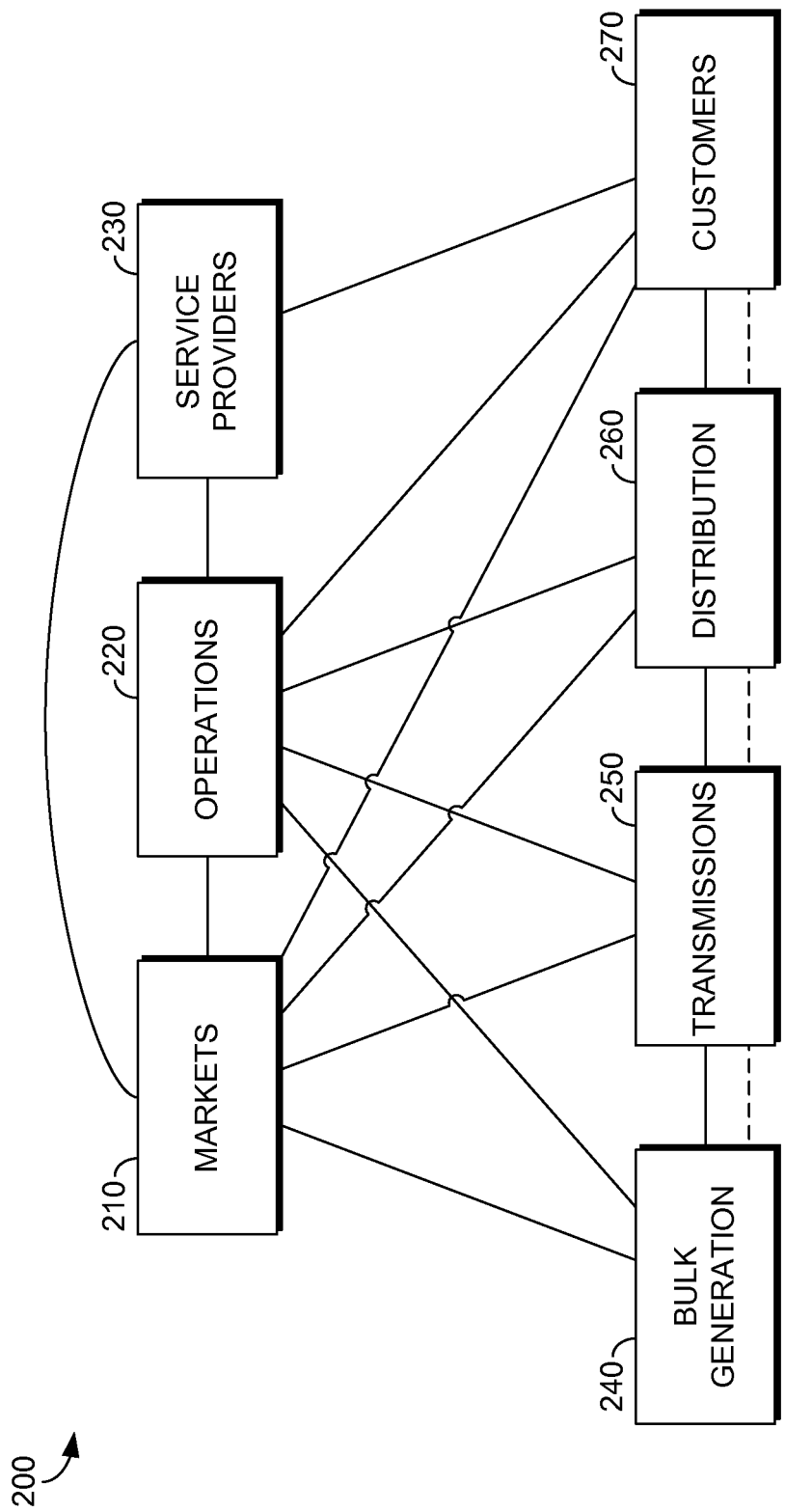
FIG. 2 is a schematic diagram of key domains of a smart grid system in which embodiments of the present invention may be employed.

To provide a general overview of a smart grid system, FIG. 2 illustrates the key domains of a smart grid framework. The key domains of a smart grid include markets 210, operations 220, service providers 230, bulk generation 240, transmissions 250, distribution 260 and customers 270. The markets 210 are the operators and participants in electricity markets. The operations 220 include managers of the movement of electricity. The service providers 230 include the organizations providing services to electricity customers and utilities. The bulk generation 240 includes generators of electricity in bulk quantities and may also store energy for later distribution. The transmissions 250 include carriers of bulk electricity over long distances and may also store and generate electricity. The distribution 260 includes distributors of electricity to and from customers and may also store and generate electricity. Finally, the customers 270 are the end users of the electricity. The customers 270 may also generate, store, and manage the use of energy. Traditionally, there are three customer types: home, commercial/building, and industrial.

A smart grid is associated with a smart meter. A smart meter is usually an electrical meter that records consumption of electric energy and communicates that information to a utility provider for monitoring and billing purposes. Smart meters may enable two-way communication between the meter and a central system at the utility and can gather data for remote reporting.

As described above, the developments in the smart grid do not include providing the end user the ability to utilize and manage distributed energy sources or the capability of the distributed energy sources, such as in residential application, to return unused energy to the power grid, or store excess energy for later use by the end-user.

Embodiments of the present invention build upon the smart grid system, as well as apart from the smart grid system, to address, at least, the deficiencies of the smart grid system.

Energy Storage System

In embodiments of the present invention, an energy storage system facilitates the storage, management, or provision of energy associated with an inhabitable environment. An inhabitable environment may include, but is not limited to, a workplace, residence, commercial or industrial environment. Generally, an inhabitable environment may comprise a heating system, a cooling system, and/or an electrical outlet. A heating system is generally a mechanism for increasing and/or maintaining temperatures at a specified degree by using thermal energy within a home, office, or other dwelling. A cooling system is generally a mechanism for decreasing and/or maintaining temperatures at a specified degree by using a refrigeration cycle. In some embodiments, an energy storage system functions as a local energy storage system. In such embodiments, the energy management system may be installed into an inhabitable environment at or near a breaker panel. In other embodiments, the energy storage system may be located remotely from the inhabitable environment. As used herein, an energy component may refer to an electrical outlet and/or an electrical device. An electrical outlet is an outlet associated with an inhabitable environment through which energy may be provided. An electrical device is a device through which energy may be consumed. Examples of an electrical device include a light switch, a television, a heating system and a cooling system.

Figure 3:
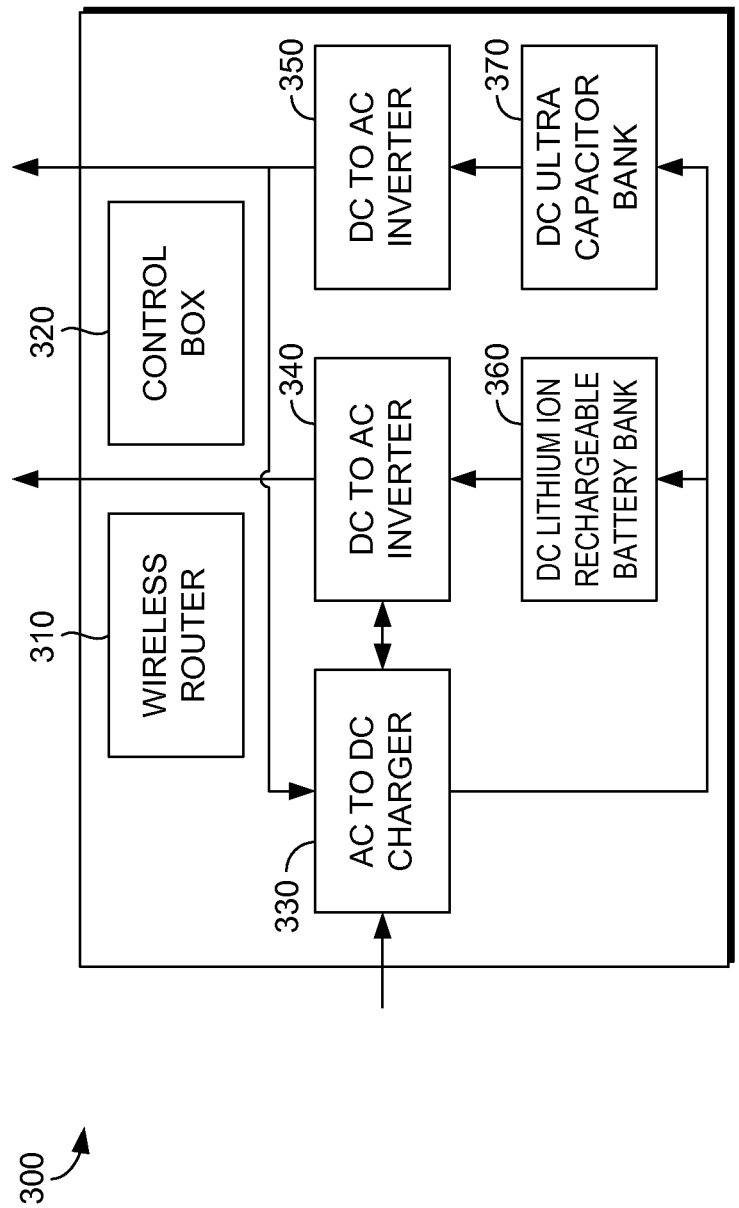
FIG. 3 is a schematic diagram of exemplary energy storage system in which embodiments of the present invention may be employed.

Referring to FIG. 3, an exemplary energy storage system 300 is shown. FIG. 3 is exemplary and not all components need to be present. Other embodiments can have more or less components than currently shown in FIG. 3. Generally, system 300 includes an alternating current (AC) to direct current (DC) charger 330, DC to AC inverter 340, DC to AC inverter 350, DC lithium ion battery bank 360, and DC ultra capacitor bank 370. With continued reference to FIG. 3, energy may enter the energy storage system at the AC to DC charger 330. The energy may travel to the DC lithium ion battery bank 360, or the DC capacitor 370. From the DC lithium ion battery 360, the energy may travel to DC to AC converter 340. From DC capacitor 370, the energy may travel to DC to AC converter 350. From DC to AC converters 340 and 350, energy may be provided to a user through an electrical medium, such as a light switch, outlet, heating system, or cooling system.

In some embodiments, an energy storage system may include a control box 320. Further, the control box 320 may include a computing device similar to that of computing device 100 found in FIG. 1. The control box 320 may be configured to facilitate various functions of the energy storage system including, but not limited to, communication with components inside or outside system 300, receipt of data, retrieval of data, analysis of data, generation of data, and the output of data. Further, in other embodiments, the energy storage system may include a wireless router 310 that facilitates communication between an energy storage system and other components inside or outside system 300. The control box 320 may be Wi-Fi and RFID enabled. The energy storage system may be compatible with various electronic components such as a heating system, cooling system, light switches, and electrical outlets. Further, the energy storage system may be compatible with electronic devices such as, but not limited to, sensors, microwaves, refrigerators, televisions, remote deadbolt locks, and video cameras, to name a few.

In various embodiments, the energy storage system may store energy in two types of storage devices, a lithium ion battery and capacitors. There are advantages associated with each type of storage device. At least one advantage of storing energy in a lithium battery includes the ability of the lithium battery to hold a steady flow of continuous power. At least one advantage of a capacitor includes the ability of a capacitor to provide energy in large quantities. For example, a large appliance may require a large amount of energy when first turned on. In such instance, a capacitor is able to provide the large appliance the necessary energy without disruption of the power flow. The energy storage system may store enough energy to power an entire home during peak electricity demand periods. In some embodiments, an energy storage system may include only a lithium ion battery. In other embodiments, an energy storage system may include only a capacitor.

In some embodiments, an energy storage system allows a user to manage the stored energy. In some embodiments, the energy storage system allows a user to control the energy provided to devices associated with the inhabitable environment. For instance, a user can manage the energy provided to each room of a home. Using the energy storage system, a user can designate that no energy be provided to an unfinished basement of the home, or designate that more energy be provided to a living area of the home.

In one embodiment, an energy storage system is configured to gather and provide energy related data. Such energy related data may include billing statements, safety notices, alerts, historical pricing data of energy provided by a utility provider, anticipated utility pricing data of energy provided by a utility provider, local, national and worldwide weather related information such as current conditions and forecasts, and historical energy usage data of a consumer. Energy related data may also include historical energy usage data of an inhabitable environment and of each of the components associated with the inhabitable environment. The historical energy usage data may include measurements and times of energy usage for and determined anticipated measurements and times of energy usage for each component of an inhabitable environment. The energy storage system may gather the energy related data information from a user, electrical outlets, and/or electrical devices. Further an energy storage system may gather energy related data by communicating with a utility provider, weather resource, or other entities related to energy consumption.

In some embodiments, the energy storage system may include a graphical user interface at a computing device located in the inhabitable environment. The graphical user interface may facilitate the interaction between the user and the energy storage system. For instance, a user can use the graphical user interface to direct energy to flow through the energy storage system or to by-pass the energy storage system. In such embodiments, the energy storage system gathers information from a user through the graphical user interface. In some embodiments, the energy storage system may provide energy related data by electronic communication over a network, such a by email, text, phone call, or the Internet. In other embodiments, the energy storage system may include a display device and provide energy related data through the display device.

Figure 4:
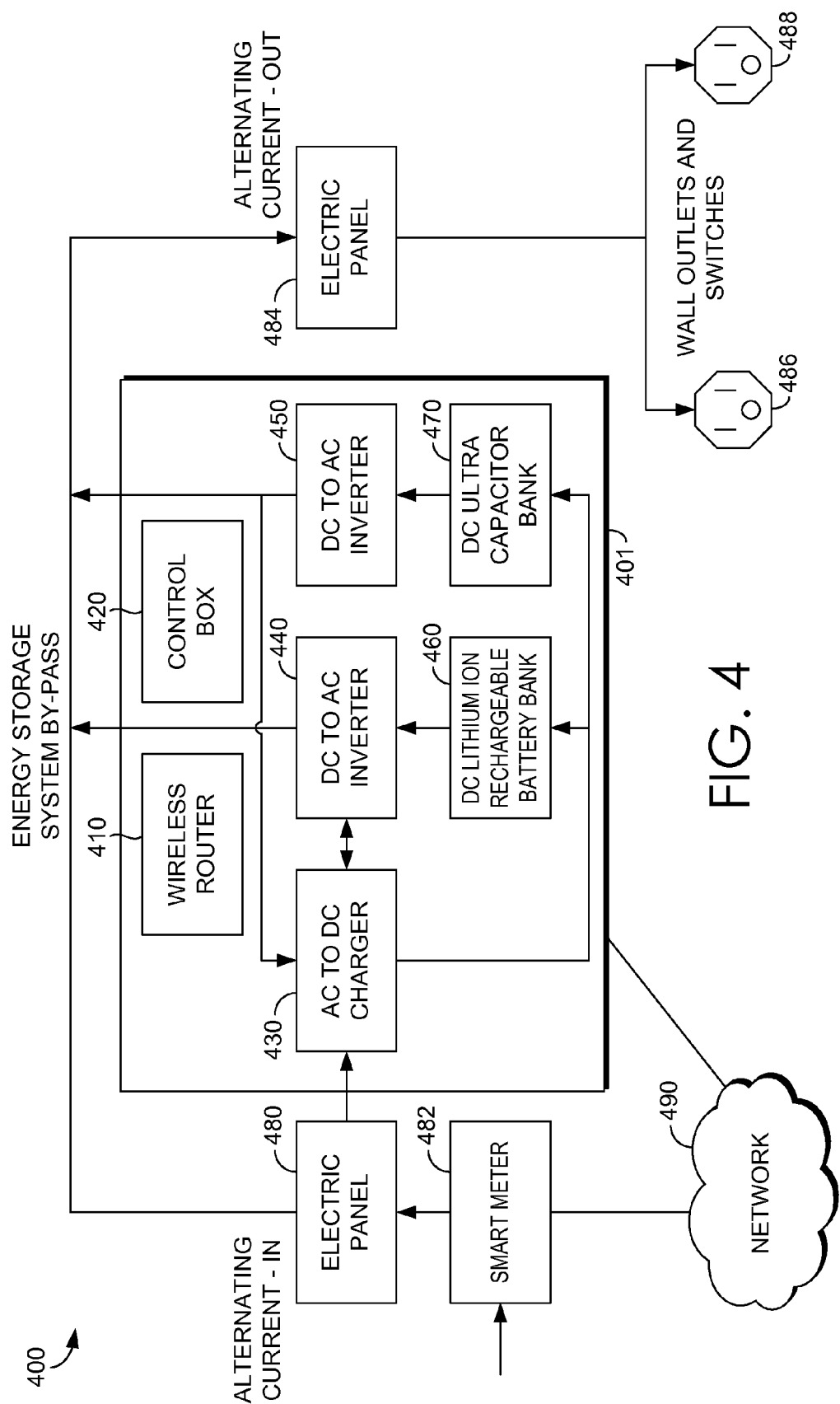
FIG. 4 is a schematic diagram depicting an exemplary energy storage system in which embodiments of the present invention may be employed.

In some embodiments, an energy storage system may be integrated with a smart meter, a smart grid, or both. FIG. 4 provides an exemplary system 400 that includes a smart meter 482, network 490 and energy storage system 401, electrical panel 480, electrical panel 484, and wall outlets and switches 486 and 488. Energy storage system 401 may communicate with smart meter 482 through network 490. Energy storage system 401 is similar to the energy storage system of system 300. Through such communication, the smart meter may instruct the energy storage system not to engage in the flow of energy, thus by-passing the energy storage system 401. In embodiments, instructions to engage or by-pass the energy storage system 401 can be provided from a smart meter 482, control box 420, or other components shown in system 400. Energy storage system 401 may gather energy related data from smart meter 482 or receive instructions from a smart meter 482. Instructions received by a smart meter may include directions to by-pass the energy storage system. In such instances, the energy storage system 401 does not engage in receiving or retrieving energy. In other embodiments, an energy storage system may be configured to accept various forms of energy from systems, such as solar systems, wind systems, and geothermal systems for off-grid power.

As shown in FIG. 5, in some embodiments, a mapping system 500 between electrical outlets and devices connected to the electrical outlets may be provided as input into an energy storage system. With such mapping system, a user may be able to control the energy provided to each device through the energy storage system. For example, a user may provide input into the energy storage system indicating that power should be provided to an electrical outlet connecting a refrigerator but not an electrical outlet connecting a microwave oven.

An energy storage system may store various amounts of energy. The amount of energy an energy storage system stores may depend on energy related data, described above. For instance, an energy storage system may store energy based on the amount of energy required by an associated inhabitable environment during a specific period of time. In another instance, the amount of energy an energy storage system stores may be based on a weather forecast. For example, a weather forecast may anticipate a two-day snow storm. Based on the weather forecast an energy storage system may store an amount of energy that can last an inhabitable environment for two days. Further, the amount of energy an energy storage system stores may depend on user preferences.

User preferences detail aspects of energy management a user may prefer. User preferences may include the times of day energy should stored and provided. User preferences may also include preferred cost of energy for a specific time period. Further, user preferences may include specific components and specific locations of an inhabitable environment to which energy should be provided.

An energy storage system may store energy during various times of the day. The time periods during which an energy storage system store energy may depend on the cost of energy, the necessity of energy, user preferences and/or energy related data. For example, an energy storage system may store energy when the rate of energy is the least expensive.

An energy storage system may provide energy during various times of the day. The time period during which an energy storage system may provide energy may be based on energy related data, user preferences, mapping data, and a threshold amount of energy stored in the energy storage system. Conversely, the time period during which the energy storage system may be bypassed is also based on energy related data, user preferences, mapping data, and a threshold amount of energy stored in the energy storage system. Further, an energy storage system may cease to provide energy based on energy related data. For instance, if a component associated with an inhabitable environment requires more energy than is stored in the energy storage system, the energy storage system may not provide the energy. Instead, the energy storage system may be by-passed allowing energy to be provided from an outside source, such as the utility provider. However, if the energy storage system contains the minimal amount of energy require for a component, the energy storage system may provide the required amount of energy. In another instance, a user preference may indicate that a certain component should not receive energy from the energy storage system, causing energy not be provided to that certain component by the energy storage system. In some embodiments, the energy storage system may not provide energy if an amount of stored energy meets a minimum threshold. For instance, an energy storage system may cease to provide energy once the energy storage system has only 5 KJ of energy stored, in which case the energy storage system may be by-passed to allow for outside energy to be provided. The minimum threshold amount of energy may be determined based on energy related data and/or a user preference.

Energy management instructions may be provided to an energy storage system instructing the energy storage system to provide a flow of energy to a specific device, electrical outlet, and/or location within the inhabitable environment. An energy management instruction may also provide instructions on a time of day to direct the flow of energy and an amount of energy that may be directed to a specific device, an electrical outlet and/or a location within the inhabitable environment. An energy management instruction may be based on preferences provided by a user, energy related data, or an amount of energy stored in an energy storage system. Additionally, an energy management instruction may be provided by a user or by a smart meter.

Energy Management System

An energy management system provides for the management of energy in an inhabitable environment. The energy management system generates energy management data that informs a user about the historical trends of, predictions of, and suggestions for energy usage.

Figure 6:
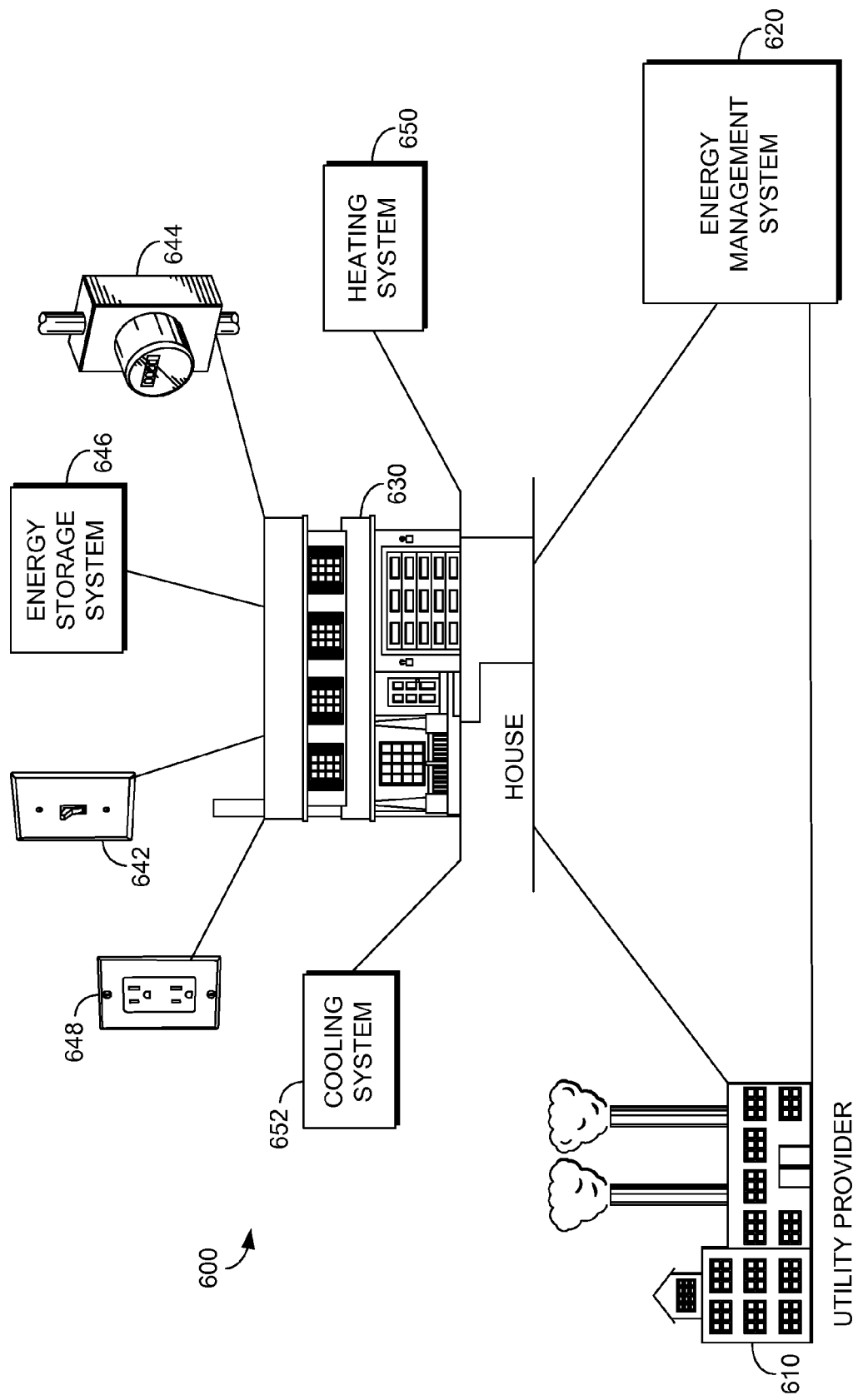
FIG. 6 is a schematic diagram of an exemplary energy management environment in which embodiments of the present invention may be employed.

Referring now to FIG. 6 is an exemplary environment 600, where an energy management system may be implemented. Environment 600 includes a utility provider 610, energy management system 620, and house 630. Also included in environment 600 are electrical components, which include light switch 642, smart meter 644, energy storage system 646, electrical outlets 648, heating system 650, and cooling system 652. The energy management system 620 may communicate with both the utility provider 610 and the electrical components associated with house 630. The energy management system 620 may be local or may be remote. The items identified here are exemplary.

Figure 7:
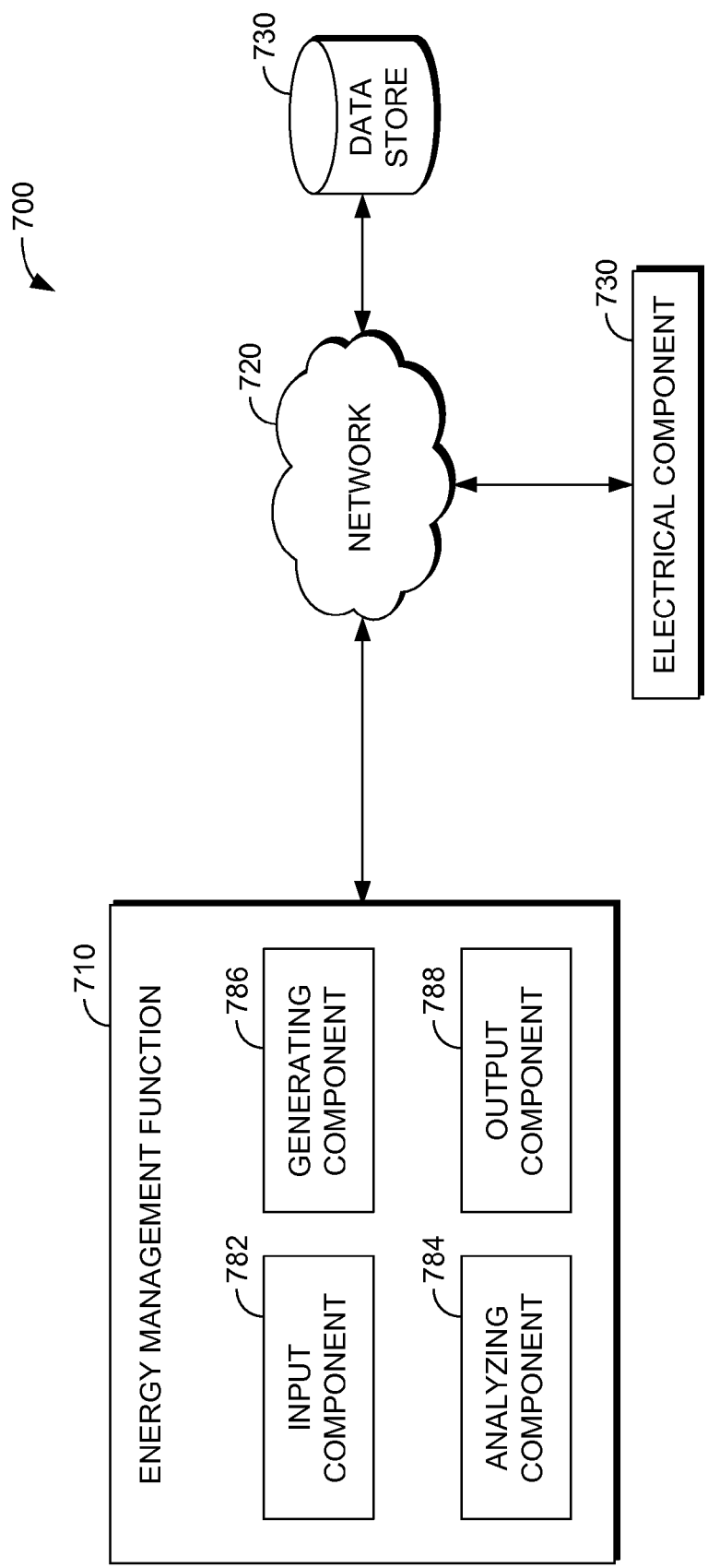
FIG. 7 is a schematic diagram for an exemplary energy management system in which embodiments of the present invention may be employed.

Referring now to FIG. 7, a block diagram of computing system 700 generally includes energy management function 710, data store 730, and electrical component 740, all in communication with one another via network 720. The network 720 may include, without limitation, local area networks (LANs), wide area networks (WANs), or both. Such networking environments are commonplace in offices, enterprise-wide computer networks, intranets, and the Internet. Accordingly, the network 720 is not further described herein.

It should be understood that any number of energy management functions, data stores, and electrical components may be employed in computing system 700 within the scope of embodiments of the present invention. Each may comprise a single device/interface or multiple devices/interfaces, memory, disks, hard drives and tapes, cooperating in a distributed environment. The components/modules illustrated in FIG. 7 are exemplary in nature and in number and should not be construed as limiting.

The data store 730 is configured to store data associated with energy flow of an inhabitable environment. Specifically, data store 730 may include energy usage data, energy management data, and mapping data. In embodiments, the data store 730 is configured to be searchable for items stored in association therewith.

Data store 730 may be storage data that comprises data associated with energy flow of the inhabitable environment. For example, data store 730 may be located at and comprise data associated with a utility provider, a smart meter, energy storage system, a consumer residence, or exist in a standalone environment.

The energy management function 710 is configured to generate energy management data. The energy management data includes, but is not limited to, cost-savings information, behavioral impact information, anticipated energy usage data, operational data, and notices associated with the consumer. Energy management data also includes cost-savings information and behavioral impact information associated a utility provider. Further description of energy management data is provided below. Using the energy management data, a user is able to manage the energy provided to a consumer and used by a consumer. As illustrated, the energy management function 710 includes an input component 782, analyzing component 784, generating component 786, and output component 788.

The input component 782 of the energy management function 710 is configured to receive or retrieve data for use in generating energy management data. Typically, the input component 782 retrieves data from data store 730. However, the input component 782 may receive or retrieve input from other sources as well, such as from a user of the energy management function, electrical component 740, or other locations within and outside network 700.

The analyzing component 784 of energy management function 710 is configured to analyze the data received by input component 782. The generating component 786 is configured to generate energy management data based on the analysis provided by the analyzing component 786.

The output component 788 is configured to communicate the generated energy management data to a user or a component located within or outside network 700. Further, the output component may also provide energy usage data or other data related to the energy usage and flow associated with an inhabitable environment.

As stated earlier, an inhabitable environment may include, but is not limited to, a workplace, residence, commercial or industrial environment. Energy usage data may include historical pricing data and anticipated pricing data of energy provided by a utility provider. Historical pricing data include the time, location, and price of previously provided energy of a consumer. Anticipated pricing data includes prices of energy currently provided and energy to be provided. In some embodiments, the "pricing data" may be referred to as "rate information." Additionally, energy usage data includes historical energy usage data of a consumer. Historical energy usage data of a consumer includes the time, place, and amount of energy previously used or consumed by a consumer at a residence, workplace, commercial or industrial environment.

Mapping data may be provided to system 700 by direct input from a user at input component 782 or retrieved from data store 730. Mapping data includes a mapping of an electrical device to an electrical component. The mapping of an electrical device to an electrical component is shown in FIG. 5. As illustrated, the mapping information includes a source location, circuit breaker information, connected device, connection via wall outlet, connection via switch, connected watts, estimated peak hours used, and estimated amps per hour. For example, the mapping of an electrical device to an electrical component allows for a specific device, such as a refrigerator to be associated with a specific electrical component, such as an electrical outlet, and further allows for the amount of watts, estimated peak hours used and estimated amps/hour used to be gathered. An electrical device includes devices not attached to an inhabitable structure. Electrical devices include, but are not limited to a refrigerator, microwave, toaster, oven, stove, television, and gaming system, to name a few. An electrical component may include components generally attached or semi-attached in an inhabitable environment. Electrical components include, but are not limited to, a heating system, cooling system, light switch, or electrical outlet. Mapping information may be used by the energy management function to determine the time and amount of energy an electrical device uses when associated with a certain electrical component. Further, the mapping information allows for a user to vary the amount of energy provided to an electrical components or electrical device.

Cost-savings information includes information associated with a consumer and includes peak time rebate information, dynamic pricing, and suggestions on how to reduce the amount of cost of energy. Peak time rebate information includes information when a reduction of the use of energy is advantageous, especially on peak-event day when electricity demand is high. Reducing energy use on such days may save a consumer money. Dynamic pricing includes information about time-based pricing of energy, where the price of the energy varies according to the time of the day, day of the week, date in the month, or month in the year. For example, using the mapping information, cost-savings information may include the amount of energy consumed when using a clothes dryer during the day versus at night. The cost-savings information may include a suggestion on how much money may be saved by using the clothes dryer at night. Cost-savings information may also include suggestions on what energy source to use. For instance, an energy storage system may have stored energy at the price of X dollars. The current price to receive energy from a utility provider may cost Y dollars where X is less than Y. Cost-savings information may include a suggestion to use cheaper stored energy instead of more expensive energy provided by the utility provider.

Behavioral impact information include information on the use of energy, such as the amount of energy used at a specific time, by an electrical device, by an electrical component, or suggestions on how to use less or more energy.

Anticipated energy usage data include information about predicted future use of energy based on previous patterns and methods of using energy. The notices provided by the energy management function includes billing statements, local, national and worldwide weather alerts, current conditions and forecasts, and energy alerts.

Cost-savings information of a utility provider includes information related to the amount, time, and consumer energy that is provided to the consumer, how that energy was used by the consumer, and how energy may be provided to the consumer in a cheaper manner. For instance, a consumer may have an energy storage system and use the most energy in the evening. It may cost more for a utility provider to provide energy to the consumer in the evening than in the morning. Cost-savings information may include a suggestion to provide a consumer with the required amount of energy for the evening in the morning such that the user may store the energy during the morning. Behavioral impact information associated with the utility provider includes information about the time, consumer, and amount of energy provided.

In some embodiments, system 700 may include a graphical user interface that allows a user to interact with the energy management system. In such embodiments, the output of energy usage data or energy management data, may be presented on the graphical user interface. In some embodiments, output of energy usage data and energy management data may be provided to a user through other forms of electronic communication such as, but not limited to an email, a display device, a phone call, a text message, or an audio device.

Energy management system 700 may be configured to use home area network (HAN) integration or Green Button integration in order to enable users to manage their energy consumption and allows for the energy management system to gather and generate efficient energy usage data and energy management data. Green Button deals with the idea of providing utility customers with easy and secure access to their energy usage information in a consumer-friendly and computer-friendly format. Further, the energy management system 700 may be configured to interact with consumers of energy and users of the system through various means, such as, but not limited to an email, a display device, a phone call, a text message, an audio device, and social media outlets.

Figure 8:
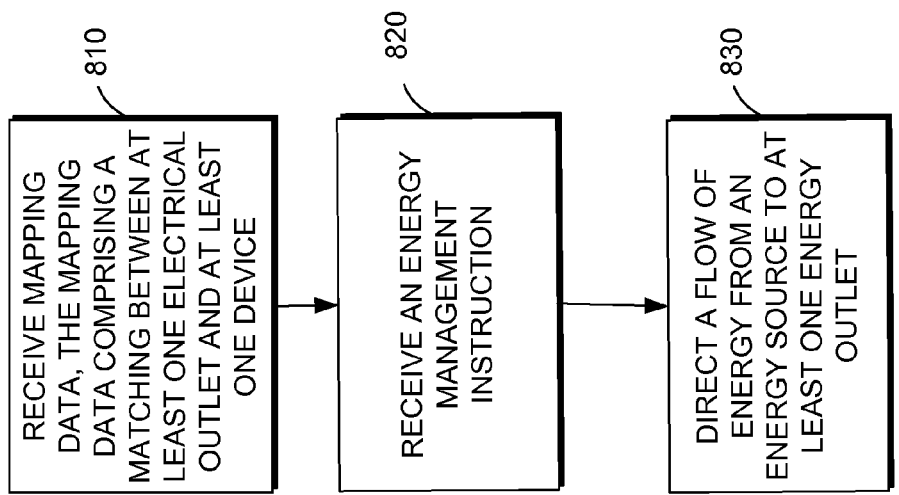
FIG. 8 is a flow diagram illustrating a method for directing a flow of energy in accordance with embodiments of the present invention.

Referring now to FIG. 8, a process for directing a flow of energy is shown in a method 800. As illustrated, in a step 810, mapping data is received. The mapping data may comprise a matching between at least one energy outlet and at least one device. In a step 820, an energy management instruction is received. In step 830, the flow of energy from an energy source to at least one energy outlet is directed. The direction of the flow of energy is based on the mapping data and the energy management instruction.

Figure 9:
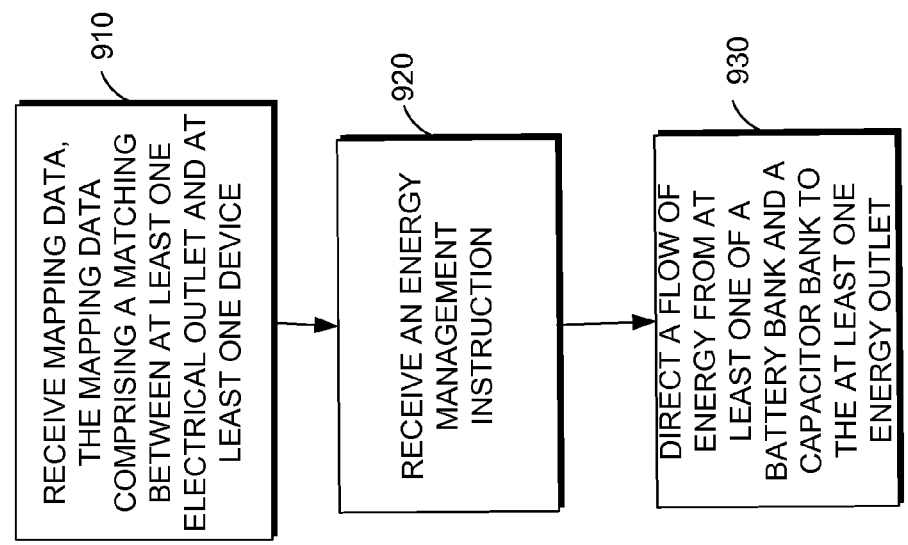
FIG. 9 is a flow diagram illustrating a method for directing a flow of energy in accordance with embodiments of the present invention.

Referring now to FIG. 9, a process for directing energy flow is provided in method 900. As illustrated, in a step 910, a mapping data in received, where mapping data comprises a matching between at least one electrical outlet and at least one device. In a step 920, an energy management instruction is received. In a step 930, a flow of energy is directed from at least one of a battery bank and a capacitor bank to at least one energy outlet.

As FIGS. 1-9 discussed embodiments of the present invention, exemplary scenarios involving implementations of embodiments of the present invention shall be discussed below.

In an implementation of an embodiment of the present invention, the energy storage system may be installed inside a residence at or near a breaker panel. The control box sends a signal to the smart meter to use the energy storage system or to by-pass the energy storage system for normal electric delivery. The energy management system works by collecting electric power during off-peak periods and storing it in two types of rechargeable battery delivery methods. As described above and particular to an embodiment, a bank of lithium batteries holds a steady flow of continuous power while a bank of ultra capacitors holds electric power that is released in bursts to jump start larger power hungry electrical components, electrical devices, or both. The bank of lithium batteries and ultra capacitors can combine into a seamless electric delivery system to power home appliances and supply daily electricity needs. The energy storage system can utilize a robust energy management system in order to provide a user comprehensive communication tools. Using the energy storage system, energy management system, or both, users can turn on/off or dim any light switch or control AC outlets. Further, users can control any plug-in electrical device in a residence 24 hours a day, from any web-enabled computer, smart phone, or other mobile device.

Explained further, the energy storage system contains a capacitor bank of ultra capacitors (UC) for DC storage to be converted to AC on demand. The UC bank holds electricity that discharges quickly and with burst of power when needed. This type of system is designed to power devices that require 3-7 times more energy for start-up surge, such as air conditioners and furnace fans. Generally, a capacitor comprises a low amount of internal resistance and can discharge quickly but may be unable to store a large amount of energy at a given time. Described further, the energy storage system contains a lithium ion battery bank to deliver smoother, more constant AC to electrical components, electrical devices, or both. Generally, a battery has a higher internal resistance than a capacitor. A battery stores electric power that is released continuously to power low consumption devices like a clock/radio or the clock/timers on appliances. The control box may be configured to receive or provide commands to the inverter to release a continuous flow of electricity from the lithium ion bank and each time a device is turned on or a light switch is turned on a command is sent to the proper inverter to release more battery power.

In an implementation of an embodiment of the present invention, the entire residence can be powered during peak electric demand periods. In embodiments, users can control each device that uses electricity. An energy storage system, energy management system, or both can send email notices and alerts to users via computer, mobile device, or both. The present invention integrates with smart meters to connect to the smart grid for two-way communication. As described above and particular to certain embodiments, the energy storage system accepts energy from solar systems, wind systems, and geothermal systems for off-grid power.

In embodiments, the energy storage system connects directly to the electric power of a residence in an area at or near a breaker panel. The control box of the energy storage system communicates with the smart mater to turn off electric power at the breaker panel and turn on the stored energy delivery system allowing the energy storage system to supply energy to a residence by an integrated bank of batteries.

In certain embodiments, the energy storage system includes a wireless router, wi-fi and RFID enabled control box with firmware, AC to DC charger, DC to AC converters, a bank of series of lithium ion batteries, and a bank of ultra-capacitors. The energy storage system provides compatible wall outlets, wall switches, sensors, and optional electrical devices such as video cameras, and remote deadbolt locks.

In an implementation of an embodiment of the present invention, the energy management system uses radio wave technology to send and receive signals from electrical components, electrical devices, or both. The energy management system can include instructions for system commands to perform specific functions such as measuring electric output of each outlet, measuring electric demand from each electrical device, heating, ventilation, and air conditioning (HVAC) units, light fixtures, and all other demands on a residence's electric use. The radio frequency identification (RFID) technology can travel through floors, walls, and ceilings.

The energy management system allows for consumers and utility providers to see electric usage from the source (e.g. power station) all the way to the electrical device, such as a refrigerator. The energy management system allows utility providers to drill down to each consumer's precise energy needs, for example, the energy needs of a single electrical outlet. This information is beneficial for load balancing projections. The energy usage data collection methods would occur via secure protocols and would be seamless to the consumer.

In embodiments, the energy management system provides a consumer the ability to control every electrical component, electrical device, or both in their inhabitable environment. A consumer is able to choose activities like turning on an entryway light at a certain time or turning on an electrical outlet where a crock-pot is plugged in order to start dinner two hours before leaving work. The energy management system can send reminder notices to all types of mobile devices.

The present invention controls operation of energy flow and determines where to route or store energy. The invention captures electricity usage data at the demand source and returns the data to the energy storage system, energy management system, or both. In an embodiment, energy is routed to a consumer through the existing energy source. In another embodiment, energy is stored for later use. In yet another embodiment, energy from an original consumer is returned to a utility company for later consumption by a different consumer.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. An energy management system for an inhabitable environment, configured to direct a flow of energy according to mapping data, the system comprising:
   a system controller having a computing device including a processor coupled to a computer readable storage medium including computer executable instructions that when executed by the processor perform a method comprising:
   receiving mapping data, the mapping data comprising a matching between at least one electrical outlet and at least one device, wherein the at least one electrical outlet and the at least one device are each associated with an inhabitable environment, the inhabitable environment comprising at least one of: a heating system, a cooling system, and the at least one electrical outlet;
   receiving an energy management instruction; and
   directing a flow of energy from an energy source to the at least one energy outlet, the direction of the flow of energy being based on the mapping data and energy management instruction, wherein the energy source comprises a combination of a peak surge "start-up energy source" and a steady power "operational energy source".

2. The system of claim 1, wherein mapping further comprises matching the at least one energy outlet to a location within the inhabitable environment.

3. The system of claim 1, wherein the energy source is a utility provider.

4. The system of claim 1, wherein the energy source comprises at least one of: a battery bank and capacitor bank, the battery bank and capacitor bank each being associated with the inhabitable environment.

5. The system of claim 1, wherein the energy management instruction comprises at least one of: an instruction to direct the flow of energy to a device, an instruction to the location within the inhabitable environment to direct the flow of energy, an instruction of a time of day to direct the flow of energy, and an instruction of an amount of energy to direct to an electrical outlet.

6. The system of claim 1, wherein the energy management instruction is received from a user.

7. The system of claim 1, wherein the energy management instruction is received from a smart meter.

8. The system of claim 1, wherein the peak surge "start-up energy source" is a bank of ultra-capacitors that holds electricity that discharges quickly and with a burst of power that is designed to power devices that require 3-7 times more energy than average for start-up surge.

9. The system of claim 1, wherein the smoother "operational energy source" is a bank of lithium ion batteries, wherein this bank of lithium batteries is used in conjunction with the "start-up energy source" to deliver smoother more constant energy to electrical components/devices.

10. A system for personal energy management, the system comprising:
   a battery bank providing at least an operational energy source;
   a capacitor bank providing at least a start-up energy source; and
   a computing device having a processor coupled to a memory, the computing device operable with a set of modules, the set of modules configured to manage a flow of energy from the battery bank and the capacitor bank to one or more electrical components,
   wherein the one or more electrical components are associated with an inhabitable environment, the one or more electrical components comprising at least one of: a heating system, a cooling system and an electrical outlet.

11. The system of claim 10, wherein the computing device is further configured to manage the storage of energy within the battery bank and the capacitor bank, the management of the storage of energy comprising at least one of:
   the amount of energy to store and time of day to store energy.

12. The system of claim 11, wherein the management of the storage of energy is based on user preferences.

13. The system of claim 10, wherein the battery bank comprises at least one lithium ion battery.

14. The system of claim 10, wherein the computing device is further configured to gather historical energy usage data from at least one of: the heating system, the cooling system, and electrical outlet.

15. The system of claim 10, wherein the computing device is further configured to comprise mapping data, the mapping data comprising a matching between at least one energy outlet and at least one of: a device and a location within the inhabitable environment.

16. The system of claim 15, wherein the computing device is configured to manage the flow of energy based on both (1) mapping data and (2) energy management instructions.

17. The system of claim 16, wherein the energy management instruction comprises at least one of: an instruction to the device to direct the flow of energy, an instruction to the location within the inhabitable environment to direct the flow of energy, an instruction of a time of day to direct the flow of energy, and an instruction of an amount of energy to direct.

18. The system of claim 10, further comprising a graphical user interface.

19. The system of claim 10, wherein the computing device receives energy management instructions from a user through the graphical user interface.

20. The system of claim 10, wherein the computing device is in communication with a smart meter and receives energy management instructions from the smart meter.

21. A method for directing a flow of energy, the method comprising:
   receiving mapping data, the mapping data comprising a matching between at least one electrical outlet and at least one device, wherein the at least one electrical outlet and the at least one device are each associated with an inhabitable environment, the inhabitable environment comprising at least one of: a heating system, a cooling system, and the at least one electrical outlet;
   receiving an energy management instruction;
   directing a flow of energy from at least one of a battery bank and a capacitor bank to the at least one energy outlet, the directing of the flow of energy being based on the mapping data and energy management instruction, wherein the energy source comprises at least one of: a battery bank and capacitor bank, and the battery bank and capacitor bank are both contained in a personal energy storage system associated with the inhabitable environment;
   directing energy flow from the capacitor bank for start-up and surge energy requirements; and
   directing energy flow from the battery bank for operational energy requirements.

22. The method of claim 21, wherein mapping further comprises matching the at least one energy outlet to a location within the inhabitable environment.

23. The method of claim 21, wherein the capacitor bank and the battery bank cooperate to provide a substantially continuous electric power delivery system to power electrical devices and supply daily electricity needs for start-up and continual operation.

* * * * *